(12) United States Patent
Satoh et al.

(10) Patent No.: US 7,995,267 B2
(45) Date of Patent: Aug. 9, 2011

(54) WAVELENGTH CONVERTER MANUFACTURING METHOD AND WAVELENGTH CONVERTER

(75) Inventors: Issei Satoh, Itami (JP); Michimasa Miyanaga, Itami (JP); Yoshiyuki Yamamoto, Itami (JP); Hideaki Nakahata, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/510,267

(22) Filed: Jul. 28, 2009

(65) Prior Publication Data

US 2010/0033806 A1 Feb. 11, 2010

(30) Foreign Application Priority Data

Aug. 6, 2008 (JP) ................................. 2008-203407

(51) Int. Cl.
*G02F 1/35* (2006.01)
(52) U.S. Cl. ........................ 359/326; 359/328; 385/122
(58) Field of Classification Search .......... 359/326–330; 385/122, 130
See application file for complete search history.

(56) References Cited

U.S. PATENT DOCUMENTS 5,150,447 A * 9/1992 Tamada et al. ................ 385/130
5,943,465 A * 8/1999 Kawaguchi et al. .......... 385/122
2002/0051282 A1* 5/2002 Tsuruma ....................... 359/332

FOREIGN PATENT DOCUMENTS

| EP | 0 767 396 A2 | 4/1997 |
|---|---|---|
| JP | H9-197455 A | 7/1997 |
| JP | 2004-239959 A | 8/2004 |
| JP | 2008-170710 A | 7/2008 |

OTHER PUBLICATIONS

Machine translation of JP2004-239959, Kawai Hitoshi, Aug. 26, 2004.*

* cited by examiner

*Primary Examiner* — Hemang Sanghavi
(74) *Attorney, Agent, or Firm* — James W. Judge

(57) ABSTRACT

Affords a wavelength converter manufacturing method and a wavelength converter whereby the transmissivity can be improved. A method of manufacturing a wavelength converter (10a) is provided with the following steps. At first, crystal is grown. Then a first crystal (11) and a second crystal (12) are formed by sectioning the crystal into two or more in such a way that the domains are the reverse of each other. The first and second crystals (11) and (12) are then interlocked in such a way that a domain inversion structure in which the polar directions of the first and second crystals (11) and (12) periodically reverse along an optical waveguide (13) is formed, and the domain inversion structure satisfies quasi-phase-matching conditions for an incoming beam (101).

7 Claims, 5 Drawing Sheets

WAVELENGTH CONVERTER MANUFACTURING METHOD AND WAVELENGTH CONVERTER

BACKGROUND OF THE INVENTION

1. Technical Field

The present invention relates to methods of manufacturing wavelength converters, and to wavelength converters themselves.

2. Description of the Related Art

Semiconductor lasers and solid-state lasers possess in their constitutional material unique output wavelengths, and the extent of the range of the wavelengths directly ties into the extent of the lasers' fields of application. Infrared light sources are employed in environmental sensing and medical/biotech applications, while application to fields including vehicle emissions testing, laser ionization mass spectrometry, analysis of fruit sugar content, dental care, noninvasive blood inspection, and cerebral blood flow measurement are under investigation.

Nevertheless, light sources such as ruby lasers, yttrium aluminum garnet (YAG) lasers, and carbon dioxide gas lasers, for example, can emit only light of a given wavelength. And while a light source such as the titanium-sapphire laser is tunable, it can emit only light of wavelengths near 650 nm to 1100 nm. Thus it is not possible to obtain laser light across the entire wavelength range. Accordingly, wavelength converters that can convert light of a given of wavelength emitted from a laser light source into light of a different wavelength are being sought.

Wavelength converters employing borate crystals such as barium borate (BBO) or lithium borate (LBO) have been widely known to date. In this type of wavelength converter, wavelength conversion takes place by means of phase matching exploiting the birefringence of the crystal. With wavelength converters exploiting crystal birefringence, however, obtaining adequate wavelength-conversion efficiency is problematic. And inasmuch as the birefringence, being an inherent property of the crystal, cannot be adjusted, the degrees of freedom, including wavelength selectivity, of wavelength converters exploiting birefringence are low.

In that regard, Japanese Unexamined Pat. App. Pub. No. 2008-170710 (Patent Document 1) discloses a wavelength converter employing a compound semiconductor crystal that contains nitrogen (N) and at least gallium (Ga) or aluminum (Al) or indium (In), and that exhibits spontaneous polarization. In Patent Document 1, a poled structure in which the spontaneous polarization is periodically reversed in a two-dimensional lattice geometry is formed in the compound semiconductor crystal, with the poled structure satisfying quasi-phase-matching (QPM) conditions two-dimensionally for an incoming beam of a first wavelength. Long interaction lengths, compared with conversion exploiting borate-crystal birefringent matching, are therefore yielded, enabling highly efficient wavelength conversion.

The foregoing Patent Document 1 further discloses a method of manufacturing a wavelength converter, with a two-dimensional domain inversion structure being formed using a compound semiconductor crystal. In particular, a mask patterned to correspond to the pattern of the two-dimensional domain inversion structure is formed onto a gallium nitride (GaN) substrate having a +c-plane. A +c-axis oriented GaN layer is thereafter formed onto the patterned mask and the +c-plane of the GaN substrate. In this case, onto the +c-plane of the GaN substrate, a +c region is epitaxially grown in such a way that the thickness of the GaN layer increases in the +c-axis direction, while onto the mask layer, a −c region is epitaxially grown in such a way that the thickness of the GaN layer increases in the −c-axis direction. A two-dimensional domain inversion structure is thereby formed.

Patent Document 1: Japanese Unexamined Pat. App. Pub. No. 2008-170710

BRIEF SUMMARY OF THE INVENTION

In the wavelength converter disclosed in the above-discussed Patent Document 1, however, the crystallinity of the GaN crystal grown onto the +c-plane of the GaN substrate, and of the GaN crystal grown onto the patterned mask differ. As a result of intensive research efforts, the present inventors discovered a problem with the crystallinity in a wavelength converter being different, in that reflection of light at the interface of the differing crystal occurs, on account of which the optical transmissivity proves to be poor.

An object of the present invention, brought about in consideration of the issues discussed above, is to make available a wavelength converter manufacturing method and a wavelength converter whereby the transmissivity can be improved.

A wavelength converter manufacturing method in one aspect of the present invention is a method of manufacturing a wavelength converter that has an optical waveguide and that converts the wavelength of an incoming beam input into the optical waveguide through one end thereof, and outputs an outgoing beam from the optical waveguide through the other end thereof, and is furnished with the following steps. Crystal is grown. A first crystal and a second crystal are formed by sectioning the crystal into two or more in such a way that the domains are the reverse of each other. The first and second crystals are interlocked in such a way that a domain inversion structure in which the polar directions of the first and second crystals periodically reverse along the optical waveguide is formed, and the domain inversion structure satisfies quasi-phase-matching conditions for the incoming beam.

In accordance with a wavelength converter manufacturing method in one aspect of the present invention, the first and second crystals are formed from a single crystal by sectioning. Therefore, there is essentially no difference in refractive index between the first and second crystals. The first and second crystals are interlocked to form the domain inversion structure, and thus when an incoming beam is transmitted through the optical waveguide, reflection in the optical waveguide at the boundary between the first and second crystals can be minimized. The fact that transmissivity losses at the boundary between the first and second crystals may accordingly be reduced makes it possible to manufacture wavelength converters in which the transmissivity of light passing through the optical waveguide is improved.

In the above-described method of manufacturing a wavelength converter, it is preferable that following the step of forming the first and second crystals, a step of etching the surface on at least one side of the first and second crystals be further provided.

The poling in the at least one etched surface of the first and second crystals can thereby be further guaranteed.

In the above-described method of manufacturing a wavelength converter, it is preferable that following the step of forming the first and second crystal, a step of polishing the surface on at least one side of the first and second crystals be further provided.

The poling in the at least one polished surface of the first and second crystals can thereby be further guaranteed.

A wavelength converter manufacturing method in another aspect of the present invention is a method of manufacturing a wavelength converter that has an optical waveguide and that converts the wavelength of an incoming beam input into the optical waveguide through one end thereof, and outputs an outgoing beam from the optical waveguide through the other end thereof, and is furnished with the following steps. A first crystal is prepared. A second crystal in which there is essentially no difference in refractive index from that of the first crystal is prepared. The first and second crystals are interlocked in such a way that a domain inversion structure in which the polar directions of the first and second crystals periodically reverse along the optical waveguide is formed, and the domain inversion structure satisfies quasi-phase-matching conditions for the incoming beam.

In accordance with the wavelength converter manufacturing method in another aspect of the present invention, the domain inversion structure is formed by the interlocking of first and second crystals between which there is essentially no difference in refractive index. Therefore, when an incoming beam is transmitted through the optical waveguide, reflection in the optical waveguide at the boundary between the first and second crystals can be controlled to a minimum. The fact that transmissivity losses at the boundary between the first and second crystals may accordingly be reduced makes it possible to manufacture wavelength converters in which the transmissivity is improved.

A wavelength converter manufacturing method in still another aspect of the present invention is a method of manufacturing a wavelength converter that has an optical waveguide and that converts the wavelength of an incoming beam input into the optical waveguide through one end thereof, and outputs an outgoing beam from the optical waveguide through the other end thereof, and is furnished with the following steps. A first crystal is grown. Two or more regularly arrayed projections are formed in the surface of the first crystal. A second crystal, which is an amorphous crystal in which there is essentially no difference in refractive index from that of the first crystal, is grown onto the surface of the first crystal. In the step of growing the second crystal, the first and second crystals are formed in such a way that a domain inversion structure in which the polar directions of the first and second crystals periodically reverse along the optical waveguide is created, and the domain inversion structure satisfies quasi-phase-matching conditions for the incoming beam.

In accordance with the wavelength converter manufacturing method in still another of the present invention, an amorphous crystal in which there is essentially no difference in refractive index from that of the first crystal is grown as the second crystal onto the first crystal. Therefore there is essentially no difference in refractive index between the first and second crystals. What is more, utilizing the first and second crystals enables facilitated formation of a poled structure. Therefore, when an incoming beam is transmitted through the optical waveguide, reflection in the optical waveguide at the boundary between the first and second crystals can be minimized. Consequently, transmissivity losses at the boundary between the first and second crystals can be reduced, thus making it possible to manufacture wavelength converters in which the transmissivity is improved.

With the foregoing wavelength converter manufacturing method, in the step of growing the second crystal, preferably the second crystal is grown so that its difference in refractive index from that of the first crystal, at wavelengths from 400 to 800 nm, will be between 0.001 and 0.1.

Losses in transmissivity at the boundary between the first and second crystals can thereby be reduced even with there being a difference in refractive index between the first and second crystals. Manufacture of wavelength converters of improved transmissivity is accordingly made possible.

A wavelength converter of the present invention, being a wavelength converter having an optical waveguide and converting the wavelength of an incoming beam input into the optical waveguide through one end thereof, and outputting an outgoing beam from the optical waveguide through the other end thereof, is furnished with a first crystal and with a second crystal in which there is essentially no difference in refractive index from that of the first crystal. The first and second crystals form a domain inversion structure in which the polar directions along the optical waveguide periodically reverse, with the domain inversion structure satisfying quasi-phase-matching conditions for the incoming beam.

In accordance with a wavelength converter of the present invention, the difference in refractive index between the first and second crystals that form the domain inversion structure is essentially nil. Therefore, when an incoming beam is transmitted through the optical waveguide, reflection in the optical waveguide at the boundary between the first and second crystals can be controlled to a minimum. Transmissivity losses at the boundary between the first and second crystals can consequently be reduced, so that wavelength converters in which the transmissivity is improved may be realized.

In the foregoing wavelength converter, preferably the first crystal and second crystals are interlocked. In that case, the wavelength converter may be readily manufactured by a wavelength converter manufacturing method in the above-described one or other aspects.

In the foregoing wavelength converter, preferably the first and second crystals have regularly arrayed projections and recesses, wherein the projections on the first crystal and the recesses in the second crystal are coupled together.

In that case, a wavelength converter simply and conveniently manufactured by a wavelength converter manufacturing method in the above-described still another aspect can be realized.

In accordance with wavelength converter manufacturing methods and wavelength converters of the present invention, difference in refractive index between the first and second crystals is essentially nil, so that reflection of light passing along the boundary between the first and second crystals may be minimized. As a consequence, wavelength converters in which the transmissivity is improved can be manufactured.

DETAILED DESCRIPTION OF THE INVENTION

Figure 1:
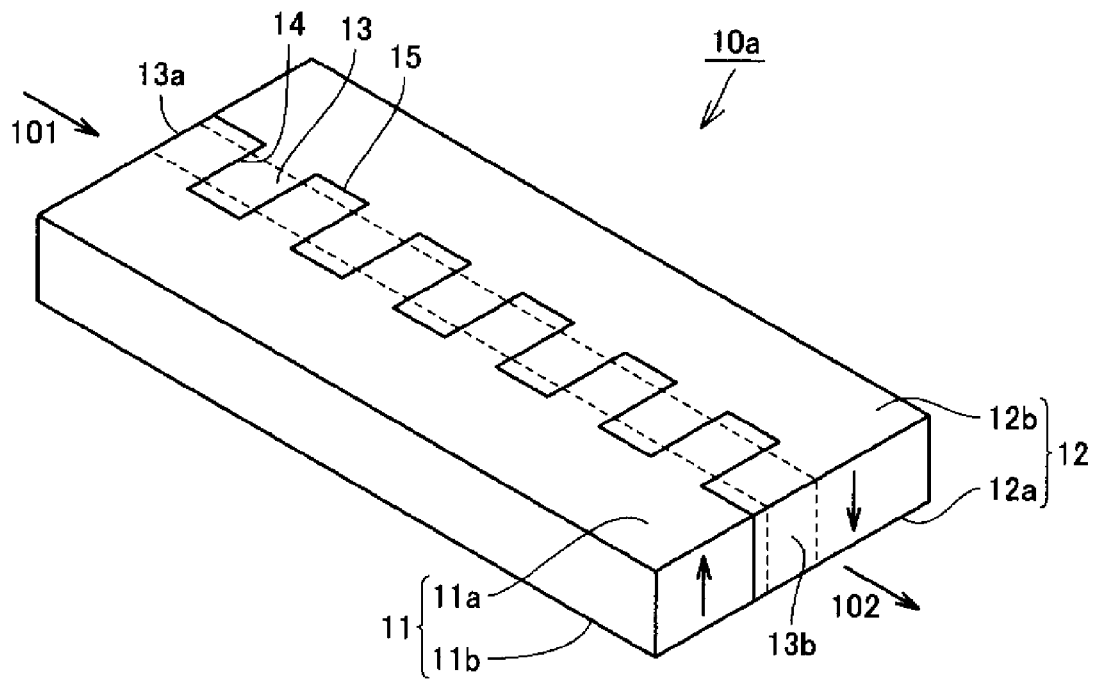
FIG. 1 is a simplified perspective view representing a wavelength converter in Embodying Mode 1 of the present invention.

Below, a description of modes of embodying the present invention will be made based on the drawings. It should be understood that in the following, identical or corresponding parts in the drawings are labeled with identical reference marks, and their description will not be repeated.

Embodying Mode 1

Reference is made to FIG. 1, a simplified perspective view representing a wavelength converter of the present embodying mode. To begin with, in the present embodying mode the wavelength converter 10*a* in FIG. 1 will be described.

As indicated in FIG. 1, the wavelength converter 10*a* in the present embodying mode has an optical waveguide 13. The optical waveguide 13 converts the wavelength of an incoming beam 101 input into the optical waveguide 13 through one end 13*a* thereof, and outputs an outgoing beam 102 from the optical waveguide 13 through the other end 13*b* thereof.

The wavelength converter 10*a* is furnished with a first crystal 11, and with a second crystal 12 in which there is essentially no difference in refractive index from that of the first crystal 11. The first and second crystals 11 and 12 preferably are monocrystalline.

The first and second crystals 11 and 12 form a domain inversion structure in which the polar directions along the optical waveguide 13 periodically reverse. That is, an optical waveguide 13 for confining light waves is formed in the first and second crystals 11 and 12 creating the domain inversion structure. The domain inversion structure satisfies quasi-phase-matching conditions for the incoming beam 101. Herein, "quasi-phase-matching conditions" are—given a structure in which, along a propagation axis in a nonlinear optical crystal, the sign of the nonlinear optical coefficient periodically reverses—the conditions that obtain phase-matching by compensating, with the wave vector of the periodic structure, the difference between the wave vector of the nonlinear domains and the wave vector of a light wave about to be generated.

For the first and second crystals 11 and 12 to form the domain inversion structure, they are respectively poled in such a way that the direction of the arrow is positive-polar, for example. That is, in the present embodying mode, the positive-polar directions of the first and second crystals 11 and 12 are opposites. In an implementation in which the first and second crystals 11 and 12 are AlN, a first—being the positive-polar—surface 11*a* of the first crystal 11 would be the Al-polar face, while a second—being on the side opposite from the positive-polar—surface 12*b* of the second crystal 12 would be the N-polar face.

Also, in the optical waveguide 13, with the adjoining first and second crystals 11 and 12 being single-cycled, the wavelength converter 10*a* will have a one or more cycles, with it preferably having five or more cycles.

It is preferable that the first and second crystal 11, 12 interfaces 14, which constitute the optical waveguide 13 and which cross the lengthwise axis of the optical waveguide 13, be free of gaps. The poling of the domains reverses at the interfaces 14. On the other hand, gaps may be present at the first and second crystal 11, 12 interfaces 15, which run parallel to the lengthwise axis of the optical waveguide 13.

The difference in refractive index between these first and second crystals 11 and 12 is essentially nil. With there being essentially no difference in refractive index, reflection of light at the interfaces 14, crossing the lengthwise axis of the optical waveguide 13 (the advancing direction of the incoming beam 101), between the first and second crystals 11 and 12 can be minimized. This makes it possible to reduce losses in the transmissivity of an incoming beam 101 passing through the optical waveguide 13. "Essentially no difference in refractive index" means that for example if the first and second crystals 11 and 12 are five-cycled (that is, there are nine interfaces 14 between the first and second crystals 11 and 12), the difference in refractive index between the first and second crystals 11 and 12 is not greater than 0.01, and if the first and second crystals 11 and 12 are ten-cycled, the difference in refractive index is not greater than 0.001. In such implementations, the wavelength converter 10*a* has a transmissivity of, for example, 90% or greater.

Herein, the refractive index is value determined, for example, employing spectral ellipsometry at a wavelength of 400 to 800 nm by means of a spectral ellipsometer.

The first and second crystals 11 and 12 in the present embodying mode are in a comb-like form, in which they have regularly arrayed projections on a surface, and thus are interdigitated. In other words, the first and second crystals 11 and 12 have projections and recesses, with the projections on the first crystal 11 interlocking into the recesses in the second crystal 12, and the recesses in the first crystal 11 interlocking with the projections on the second crystal 12.

Furthermore, at least one or the other of the first and second crystals 11 and 12 has a dislocation density of from $1 \times 10^3$ cm$^{-2}$ to less than $1 \times 10^7$ cm$^{-2}$, preferably of from $1 \times 10^3$ cm$^{-2}$ to less than $1 \times 10^5$ cm$^{-2}$. In the present embodying mode the dislocation density of the first and second crystals 11 and 12 is within said range. Being less than $1 \times 10^7$ cm$^{-2}$ makes it possible to curtail absorbance of the energy of the incoming beam 101 at dislocations, so that elevation in the temperature of the first and second crystals 11 and 12 may be restrained. Use-based degradation in intensity of the outgoing beam 102 can therefore be curtailed, allowing the lifespan during which the characteristics are sustainable to be improved. Being less than $1 \times 10^5$ cm$^{-2}$ enables effective minimization of incoming-beam 101 energy absorbance at dislocations. While lower dislocation densities are preferable, from the perspective of allowing easy manufacture, the lower limit is $1 \times 10^3$ cm$^{-2}$.

Herein, the dislocation density is for example a value (etch pit density, or "EPD") determined by means of an alkali etching process in which the number of pits that appear as a result of etching within molten potassium hydroxide (KOH) is counted and divided by unit surface area.

While the first and second crystals 11 and 12 may differ in chemical composition, preferably they are of the same composition. Also, the first and second crystals 11 and 12 preferably are composed of $Al_xGa_{(1-x)}N$ ($0.5 \leq x \leq 1$). In this case, owing to the thermal conductivity when the atomic fraction x of Al is from 0.5 to 1, having the crystals have the forgoing dislocation density ensures the result that the lifespan may be improved will be demonstrated. Here, the atomic fraction x in $Al_xGa_{(1-x)}N$ is the molar ratio of Al.

Figure 2:
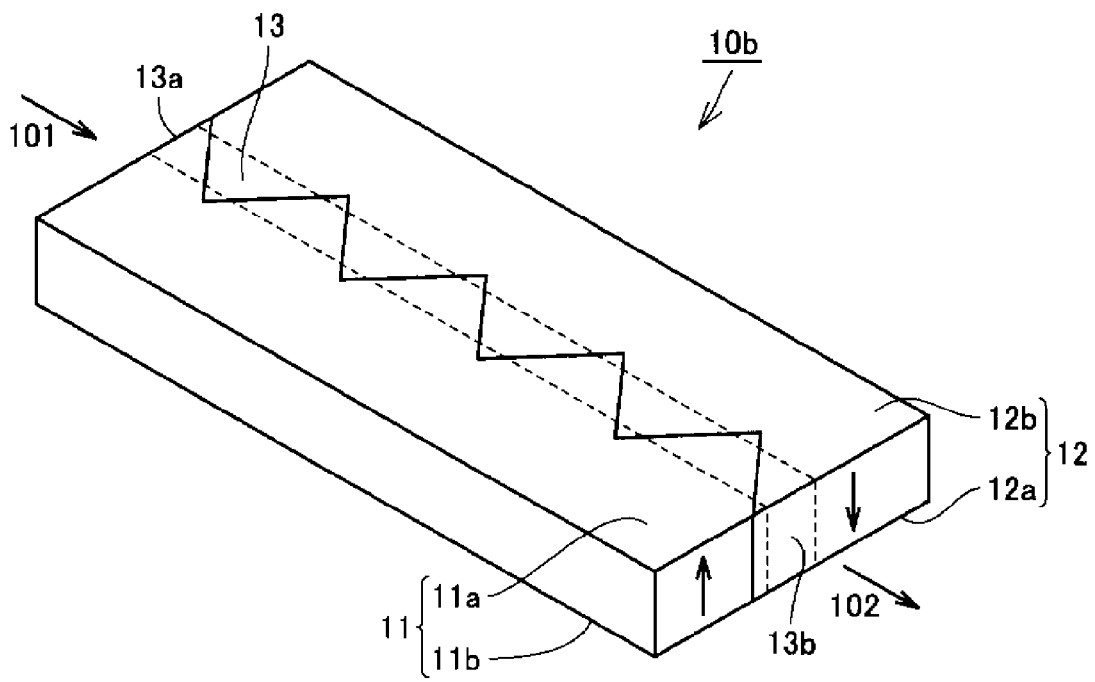
FIG. 2 is a simplified perspective view representing a wavelength converter in a modified example of Embodying Mode 1 of the present invention.

Reference is now made to FIG. 2, a simplified perspective view representing a wavelength converter 10*b* in a modified example of the present embodying mode. As indicated in FIG. 2, the geometry of the first and second crystals 11 and 12 where they interlock may be in a sawtooth form. Moreover, the first and second crystals 11 and 12, not being particularly limited to geometries such as comb-like or sawtooth, may have a wavelike or other geometry.

Figure 3:
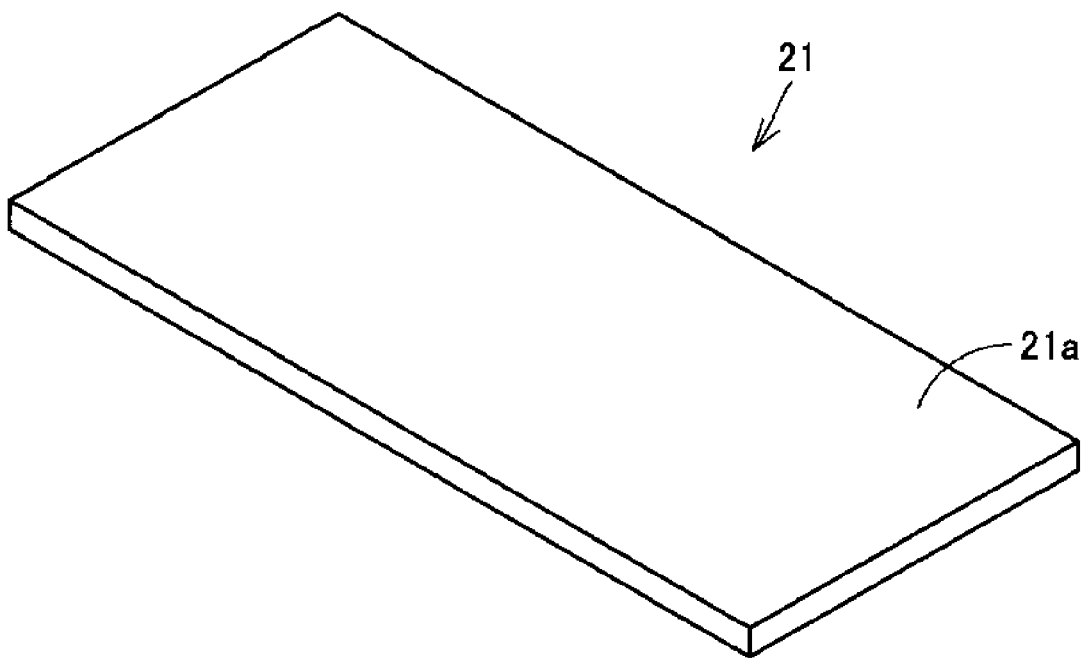
FIG. 3 is a simplified perspective view representing a starting substrate in Embodying Mode 1 of the present invention.

To continue, a method of manufacturing a wavelength converter in the present embodying mode will be described. Reference is made to FIG. 3, a simplified perspective view representing a starting substrate 21 in the present embodying mode. As indicated in FIG. 3, the starting substrate 21 is prepared. The starting substrate 21 has a major surface 21a. The major surface 21a is for example the (001) plane (c-plane).

It is preferable that the starting substrate 21 that is prepared have the same chemical composition as the crystal 22 that is grown. Preparing a starting substrate 21 composed of $Al_xGa_{(1-x)}N$ ($0.5 \leq x \leq 1$) is also preferable.

Figure 4:
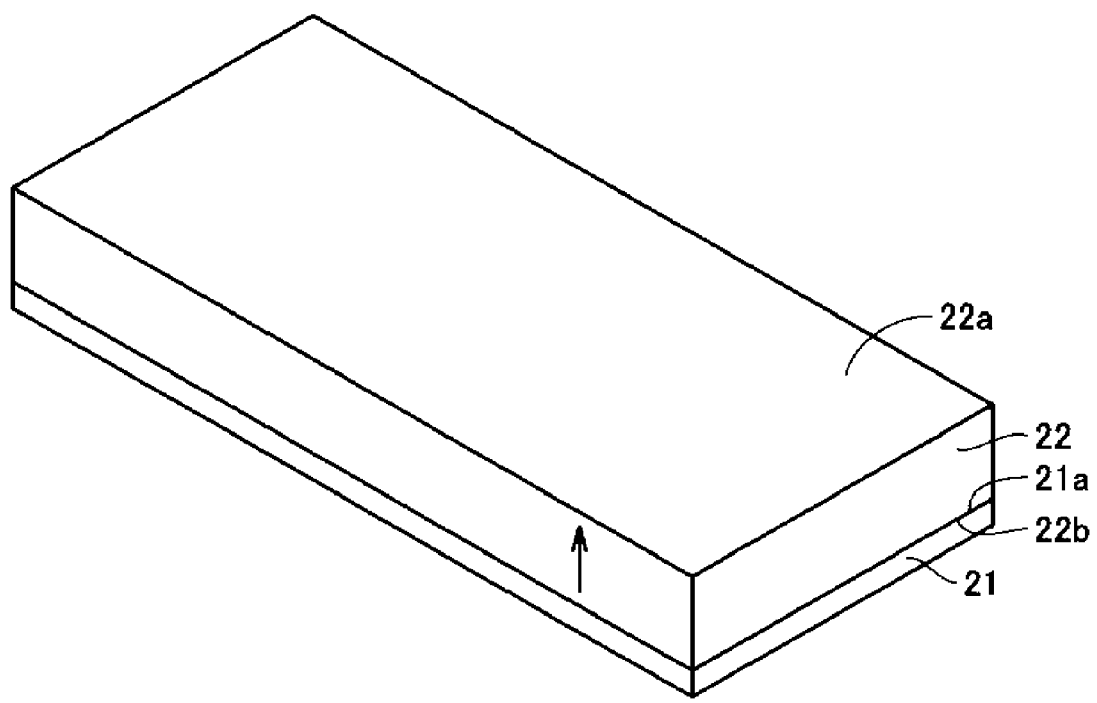
FIG. 4 is a simplified perspective view representing a situation in which a crystal has been grown, in Embodying Mode 1 of the present invention.

Reference is made to FIG. 4 a simplified perspective view representing a situation in which a crystal 22 has been grown in the present embodying mode. Next, as indicated in FIG. 4 the crystal 22 is grown onto the major surface 21a of the starting substrate 21.

In implementations in which crystal 22 of the same composition as the starting substrate 21 is grown, lattice mismatch and the like between the starting substrate 21 and crystal 22 is alleviated, thus making it possible to grow crystal 22 of low dislocation density. In the present embodying mode, the dislocation density of the growth crystal 22 preferably is from $1 \times 10^3$ cm$^{-2}$ to less than $1 \times 10^7$ cm$^{-2}$, more preferably from $1 \times 10^3$ cm$^{-2}$ to less than $1 \times 10^5$ cm$^{-2}$.

Further, the crystal 22 is grown so as to contact the major surface 21a of the starting substrate 21. That is, no mask or other such layer intervenes between the starting substrate 21 and the crystal 22. Thereby, crystal 22 poled in such a way that the direction of the arrow (the growth front) will be positive-polar is obtained.

The growth method is not particularly limited; a vapor deposition process such as sublimation deposition, hydride vapor-phase epitaxy (HVPE), molecular-beam epitaxy (MBE), and metalorganic chemical vapor deposition (MOCVD), or solution deposition processes including flux methods, and high-nitrogen-pressure growth can be adopted.

Figure 5:
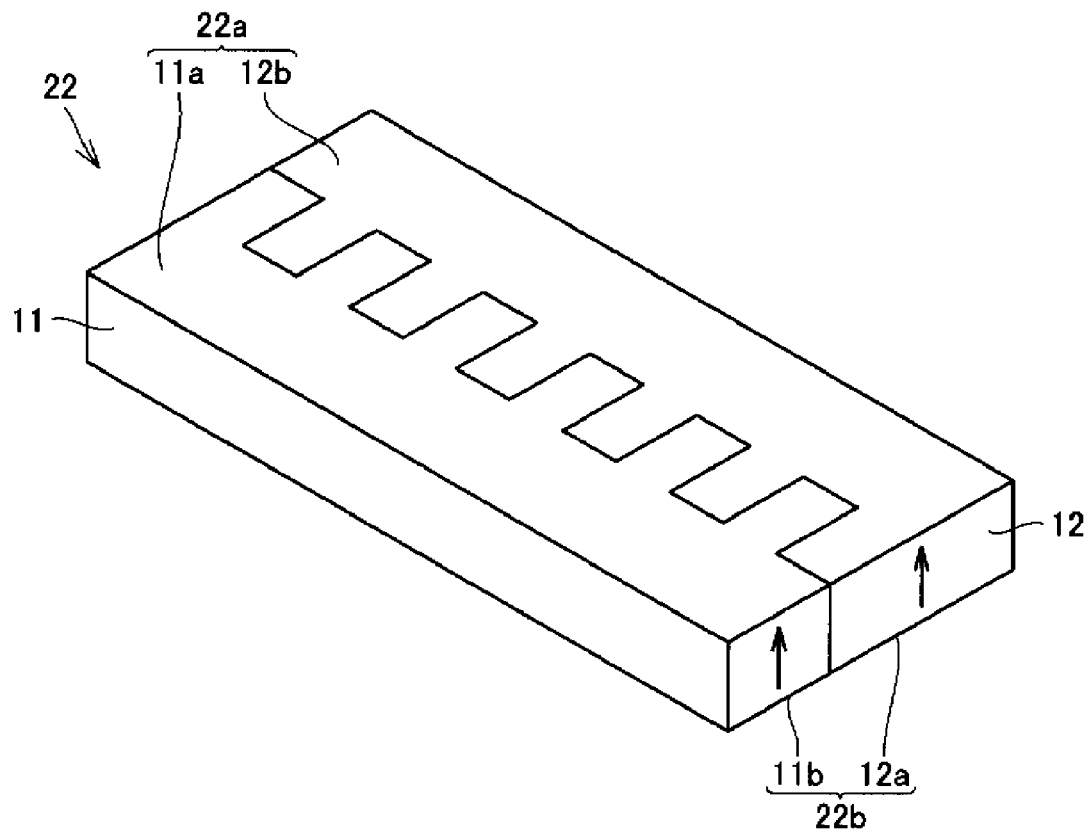
FIG. 5 is a simplified perspective view representing a situation in which a crystal is sectioned, in Embodying Mode 1 of the present invention.
Figure 6:
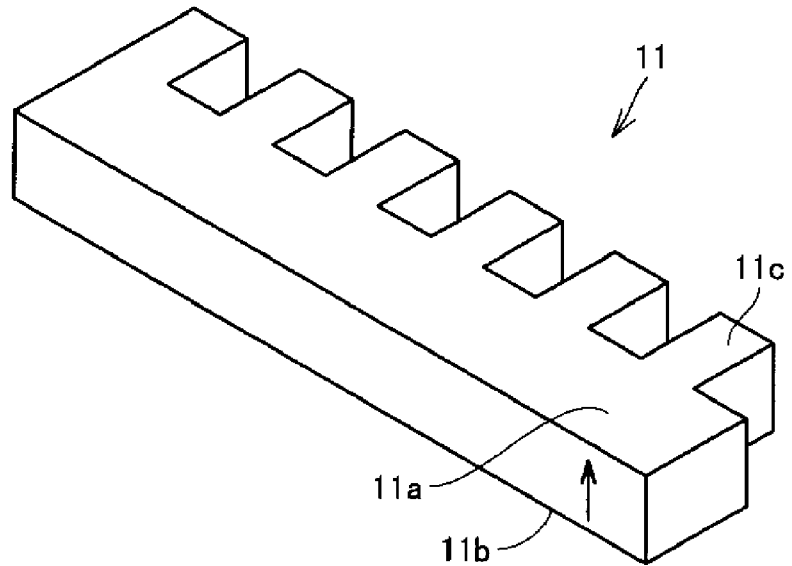
FIG. 6 is a simplified perspective view representing a crystal having been sectioned to form a first crystal, in Embodying Mode 1 of the present invention.

Reference is now made to FIG. 5, a simplified perspective view representing a situation, in the present embodying mode, in which the crystal 22 is sectioned, and to FIG. 6, a simplified perspective view representing the crystal 22 having been sectioned to form a first crystal 11, in the present embodying mode. Next, as indicated in FIGS. 5 and 6, the crystal 22 is sectioned into two or more in such a way that the domains are the reverse of each other, whereby the first crystal 11 and the second crystal 12 are formed. Inasmuch as the first and second crystals 11 and 12 are formed from a single crystal 22, the chemical compositions and refractive indices of the first and second crystals 11 and 12 are the same.

Again, in implementations employing crystal 22 of low dislocation density, first and second crystals 11 and 12 that preferably are from $1 \times 10^3$ cm$^{-2}$ to less than $1 \times 10^7$ cm$^{-2}$, more preferably from $1 \times 10^3$ cm$^{-2}$ to less than $1 \times 10^5$ cm$^{-2}$, can be formed.

In the present embodying mode, as indicated in FIG. 5, the growth front (major surface 22a) is sectioned along growth axis so as to be in a comb-like form. That is, seen from the major surface 22a of the crystal 22, the first and second crystals 11 and 12 are sectioned so as to be in comb-like forms.

When sectioned in this way, the major surface 22a of the crystal 22 forms a first surface 11a of the first crystal 11, and a second surface 12b of the second crystal 12. The back side 22b of the crystal 22 on the opposite side from the major surface 22a forms a second surface 11b of the first crystal 11, and a first surface 12a of the second crystal 12.

While the method of sectioning is not particularly limited, a laser or wire saw can be employed. Sectioning by means of a laser is advantageous in that it allows the machining accuracy to be improved. Employing a wire saw is advantageous in that it allows costs to be reduced.

A first crystal 11 can thereby be formed in which, as indicated in FIG. 6, the direction heading from the second surface 11b to the first surface 11a is positive-polar. Likewise, a second crystal 12 in which the direction heading from the first surface 12a to the second surface 12b is positive-polar can be formed.

Figure 7:
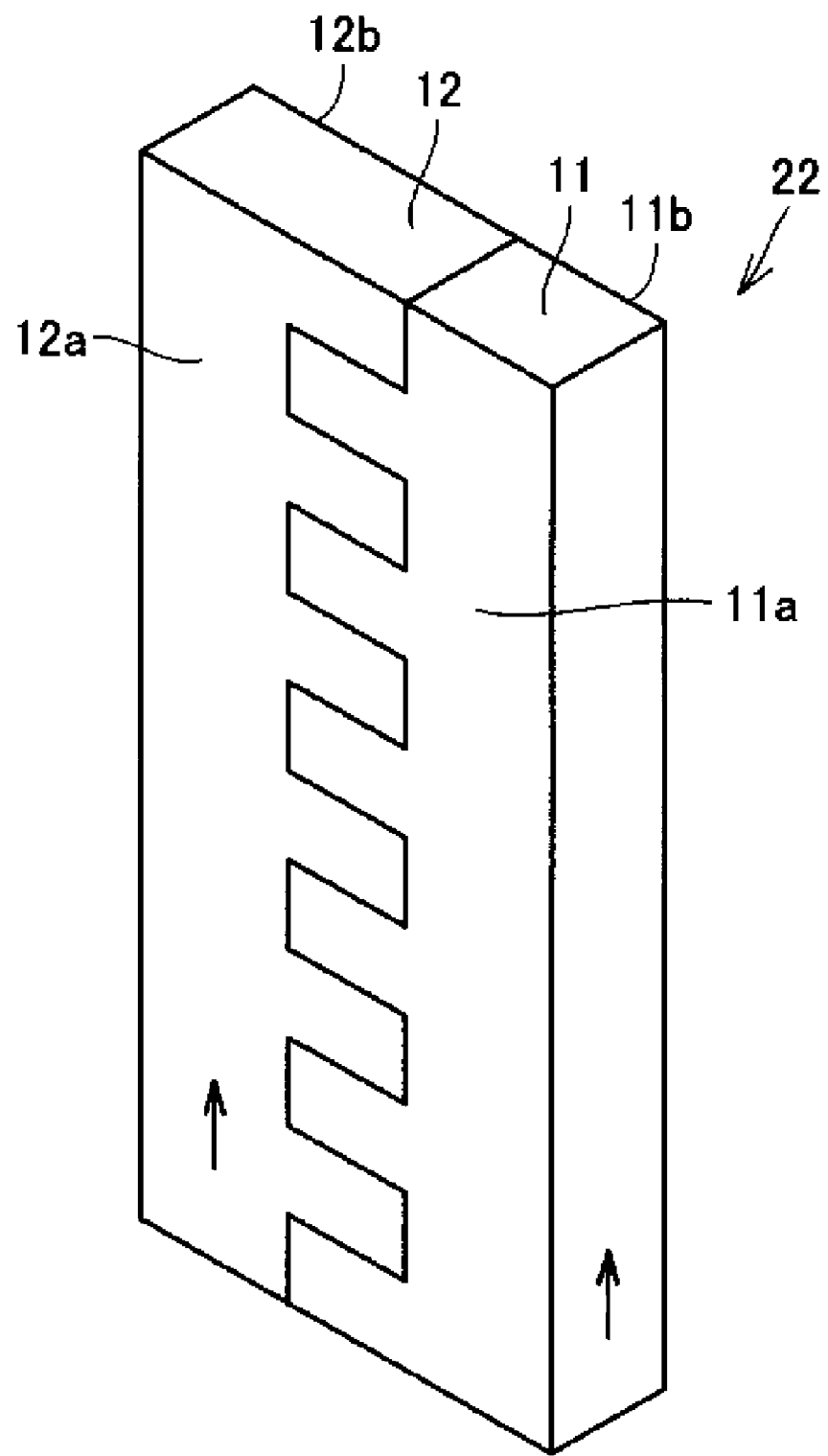
FIG. 7 is a simplified perspective view representing a separate situation in which a crystal has been sectioned, in Embodying Mode 1 of the present invention.

Reference is made to FIG. 7, a simplified perspective view representing a separate situation, in the present embodying mode, in which a crystal 22 has been sectioned. As indicated in FIG. 7, the crystal 22 may be sectioned along the growth axis in such a way that the growth-front (major-surface 22a) intersecting surface (the surface paralleling the growth axis) will be comb-like, to form the first and second crystals 11 and 12.

Here again, the geometry into which the crystal 22 is sectioned is not limited to the comb-like forms depicted in FIGS. 5 and 7. The crystal 22 may be sectioned in such a way that one of the surfaces will be in a sawtooth geometry, as depicted in FIG. 2. In that case, the advantage is that the machining is extraordinarily easy.

Next, at least one surface of the first and second crystals 11 and 12 is etched. The poling in the at least one surface of the first and second crystals 11 and 12 can thereby be further guaranteed. The etching may be either wet etching or dry etching.

For example, if the first and second crystals 11 and 12 are AlN, then etching in KOH as a wet etch makes it possible readily to form a face in which the Al atoms are terminal, since the etch rate of the N atoms is faster than the etch rate of the Al atoms. Meanwhile, reactive ion etching (RIE) as a dry etch, with the one face being a mask, makes it possible readily to form on the other surface a face in which the Al atoms are terminal. It should be understood that the etching step may be omitted.

Next, at least one surface of the first and second crystals 11 and 12 is polished. The polished surface makes more reliable poling possible. While the polishing method is not particularly limited, a process such as chemical mechanical planarization (CMP), for example, may be adopted. It should be understood that the polishing step may be omitted. Moreover, either the etching step or the polishing step alone may be implemented, or both steps may be implemented. Where both are implemented, the polishing step may be implemented prior to the etching step.

Next, the first and second crystals 11 and 12 are put together to form a domain inversion structure in which the polar directions of the first and second crystals 11 and 12 periodically reverse along the optical waveguide 13, and so that the domain inversion structure satisfies quasi-phase-matching conditions for the incoming beam 101.

More specifically, as indicated in FIG. 5 as well as FIG. 7, one alone of the sectioned first and second crystals 11 and 12 is reversed 180°, and the comb-like faces are set opposite each other. In that state, the first and second crystals 11 and 12 are interlocked. Inasmuch as the first and second crystals 11 and 12 in the present embodying mode are comb-like or saw-toothed, the projections on the first crystal 11 and the recesses in the second crystal 12 (the recesses in the first crystal 11 and the projections on the second crystal 12) are fit into each other.

Afterwards, annealing may be carried out to eliminate any gaps along the interfaces 14 between the first and second crystals 11 and 12.

In accordance with the foregoing, as indicated in FIG. 1 as well as FIG. 2, wavelength converters 10a and 10b can be manufactured by forming a domain inversion structure in which the polar direction along an optical waveguide 13 is periodically inverted, wherein the domain inversion structure satisfies quasi-phase matching conditions for an incoming beam 101.

To continue, the functioning of the wavelength converters 10a and 10b will be described. Initially, an incoming beam 101 is input through one end 13a of the optical waveguide 13 in the wavelength converters 10a and 10b. The incoming beam 101 is preferably input perpendicular to the poling interfaces 14 in the first and second crystals 11 and 12. The incoming beam 101 passes through the optical waveguide 13, heading toward the other end 13b of the optical waveguide 13. At that time, in the optical waveguide 13 the phase of the incoming beam 101 is converted by the first and second crystals 11 and 12 having the domain inversion structure satisfying the quasi-phase matching conditions. An outgoing beam 102 in which the wavelength has been converted is then output through the other end 13b of the optical waveguide 13. An incoming beam 101 of a given wavelength can thereby be converted into an outgoing beam 102 of a different wavelength.

As described in the foregoing, wavelength converters 10a and 10b in the present embodying mode are wavelength converting devices having an optical waveguide 13, and converting the wavelength of an incoming beam 101 input through one end 13a of the optical waveguide 13 and outputting an outgoing beam 102 through the other end 13b of the optical waveguide 13, and are furnished with a first crystal 11, and a second crystal 12 whose difference in refractive index from that of the first crystal 11 is essentially nil. The first and second crystals 11 and 12 form a domain inversion structure in which the polar direction along the optical waveguide 13 is periodically inverted, with the domain inversion structure satisfying quasi-phase matching conditions for the incoming beam 101.

A method of manufacturing the wavelength converters 10a and 10b in the present embodying mode is provided with: a step of growing crystal 22; a step of forming a first crystal 11 and a second crystal 12 by sectioning the crystal 22 into two or more in such a way that the domains are the reverse of each other; and a step of interlocking the first and second crystals 11 and 12 to form a domain inversion structure in which the polar directions of the first and second crystals 11 and 12 along the optical waveguide 13 periodically reverse, in such a way that the domain inversion structure satisfies quasi-phase-matching conditions for the incoming beam 101.

In accordance with a method of manufacturing wavelength converters 10a and 10b in the present embodying mode, the first and second crystals 11 and 12 are formed from a single crystal 22 by sectioning. Therefore, the refractive index of the first and second crystals 11 and 12 is the same. The first and second crystals 11 and 12 are interlocked to form the domain inversion structure, and thus when an incoming beam 101 is transmitted through the optical waveguide 13, reflection in the optical waveguide 13 at the interfaces 14 between the first and second crystals 11 and 12 can be minimized. The fact that transmissivity losses at the interfaces 14 between the first and second crystals 11 and 12 may accordingly be reduced makes it possible to manufacture wavelength converters 10a and 10b in which the transmissivity—as expressed by the intensity, with respect to the intensity of an incoming beam 101 input through the one end 13a of the optical waveguide 13, of an outgoing beam 102 output through the other end 13b—is improved.

What is more, the wavelength converters 10a and 10b can be manufactured by sectioning the first and second crystals 11 and 12 from the crystal 22, inverting one and fitting them together. Wavelength converters 10a and 10b utilizing first and second crystals 11 and 12 composed of, for example, $Al_xGa_{(1-x)}N$ ($0.5 \leq x \leq 1$) can therefore readily be manufactured.

Embodying Mode 2

A wavelength converter in the present embodying mode is almost like the wavelength converters 10a and 10b of Embodying Mode 1 represented in FIG. 1 as well as FIG. 2. Further, the first crystal 11 alone has polarity, while it is acceptable for the second crystal 12 not to have polarity.

To continue, a method of manufacturing wavelength converters 10a and 10b in the present embodying mode will be described. The wavelength converter 10a and 10b manufacturing method of the present embodying mode comprises a configuration basically like that of Embodying Mode 1, but differs in that a second crystal 12 formed from the crystal 22 from which the first crystal 11 is formed is not used.

Specifically, a starting substrate 21 is prepared in the same manner as in Embodying Mode 1. Next, a first crystal 11 (crystal 22) is grown in the same manner as in Embodying Mode 1.

Next, a second crystal 12, having essentially no difference in refractive index from that of the first crystal 11, is prepared. In the present embodying mode, the first crystal 11 depicted in FIG. 6 is formed, and a second crystal 12 that can form a domain inversion structure with the first crystal 11 is prepared.

For the method of preparing the second crystal 12, for example, second crystals 12 formed from crystal 22 separate from the crystal 22 from which the first crystal 11 is formed are prepared by forming pluralities of the first and second crystals 11 and 12 depicted in FIG. 5 or FIG. 7. Alternatively, to prepare the second crystal 12, crystal 22 may be grown so as not to have polarity, machined to have a geometry that inter-fits with the first crystal 11. Here, the first and second crystals 11 and 12 are of essentially the same chemical composition; thus difference in refractive index is essentially nil.

In this case, the crystal 22 is formed onto a starting substrate 21 of the same chemical composition, and thus even though the first and second crystals 11 and 12 are not formed from the same crystal 22, the dislocation density of the first and second crystals 11 and 12 can be reduced to from $1 \times 10^3$ $cm^{-2}$ to less than $1 \times 10^7$ $cm^{-2}$.

Next, in the same manner as in Embodying Mode 1, the first and second crystals 11 and 12 are interlocked to form a domain inversion structure in which the polar directions of the first and second crystals 11 and 12 along the optical waveguide 13 periodically reverse, in such a way that the domain inversion structure satisfies quasi-phase-matching conditions for an incoming beam 101. Wavelength converters 10a and 10b of the present embodying mode can thereby be manufactured.

In accordance with a method, as described above, in the present embodying mode of manufacturing wavelength converters 10a and 10b, a step of preparing a first crystal 11, and a step of preparing second crystal 12 having essentially no difference in refractive index from that of the first crystal 11 are provided, and a domain inversion structure is formed by interlocking the first and second crystals 11 and 12 whose difference in refractive index is essentially nil. Therefore, even with the first and second crystals 11 and 12 being formed from different crystals 22, reflection in the optical waveguide 13 at the interfaces 14 between first and second crystals 11 and 12 when an incoming beam 101 passes through the optical waveguide 13 can be minimized. Consequently, transmissivity losses at the interfaces 14 between the first and second crystals 11 and 12 can be reduced, thus making it possible to manufacture wavelength converters 10a and 10b in which the transmissivity is improved.

What is particularly advantageous is that poling the first crystal 11 only, forming the second crystal 12 from another material, and interlocking the first crystal 11 and the second crystal 12 allows the wavelength converters 10a and 10b to be manufactured with ease.

Embodying Mode 3

Figure 8:
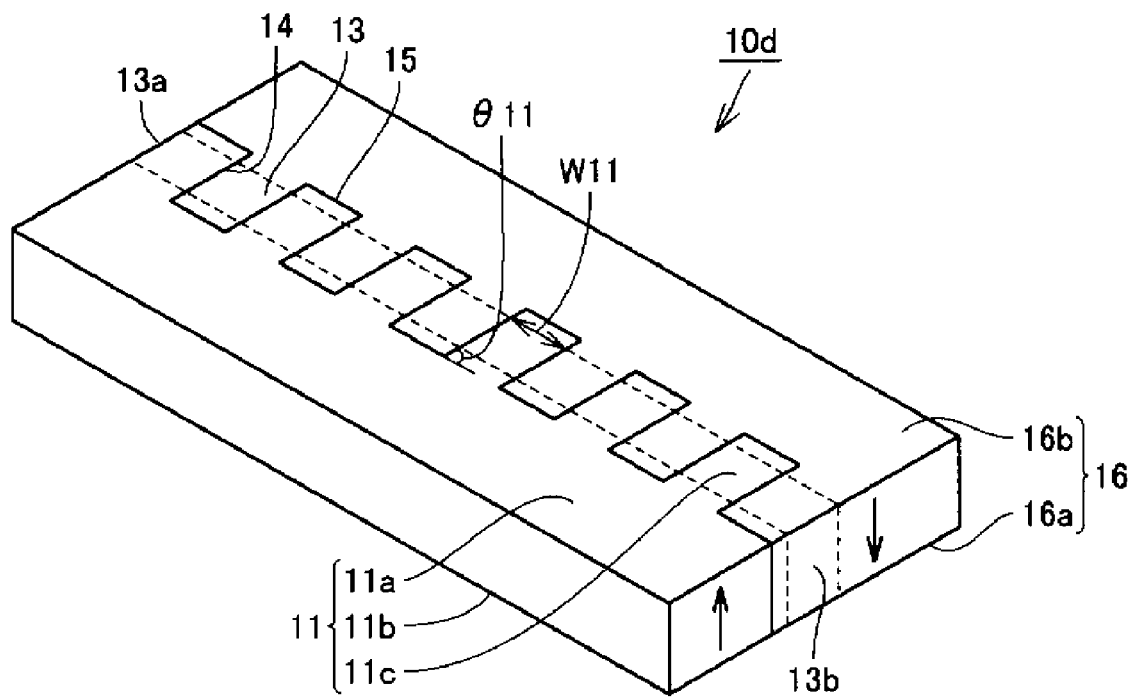
FIG. 8 is a simplified perspective view representing a wavelength converter in Embodying Mode 3 of the present invention.

Reference is made to FIG. 8, a simplified perspective view representing a wavelength converter in the present embodying mode. As indicated in FIG. 8, a wavelength converter 10d in the present embodying mode comprises a configuration basically like that of Embodying-Mode 1 wavelength converter 10a depicted in FIG. 1, but differs in that the second crystal is an amorphous crystal 16. There is essentially no difference in the refractive index of the amorphous crystal 16 from the refractive index of the first crystal 11; difference from the refractive index of the first crystal 11, at wavelengths from 400 to 800 nm, is preferably between 0.001 and 0.1.

In the present embodying mode, the first crystal 11 is preferably monocrystalline, and preferably has a dislocation density of from $1 \times 10^3$ cm$^{-2}$ to less than $1 \times 10^7$ cm$^{-2}$.

In a surface (first surface 11a) of the first crystal 11, as illustrated in FIGS. 6 and 8, two or more regularly arrayed projections 11c and recesses are formed. The two or more projections 11c jut out in the same conformation, oriented on lines crossing the lengthwise axis of the optical waveguide 13 (the direction along which the incoming beam 101 passes through the optical waveguide 13). It is preferable that in the projections 11c the width $W_{11}$, as indicated in FIG. 8, of the sections constituting the wall faces in the optical waveguide 13 be at least a predetermined size. The predetermined size is, for example, at least 26 µm. Moreover, in the projections it is preferable that the jutting angle $\theta_{11}$ be in the vicinity of 90°.

The amorphous crystal 16 has projections and recesses in the same fashion as the first crystal 11. The recesses in the amorphous crystal 16 couple with the projections 11c on the first crystal 11, and the projections on the amorphous crystal 16 couple into the recesses in the first crystal 11.

Now a method of manufacturing a wavelength converter in the present embodying mode will be described. To begin with, a starting substrate 21 is prepared in the same way as in Embodying Mode 1. Next, a first crystal 11 is grown onto the starting substrate 21. Then, two or more regularly arrayed projections are formed in a surface of the first crystal 11. In these steps, the crystal 22 is grown onto the starting substrate 21, and a first crystal 11 having at least two regularly arrayed projections is sectioned from the crystal 22, in the same way, for example, as in Embodying Mode 1. A first crystal 11 as depicted in FIG. 6 can thereby be formed.

Figure 9:
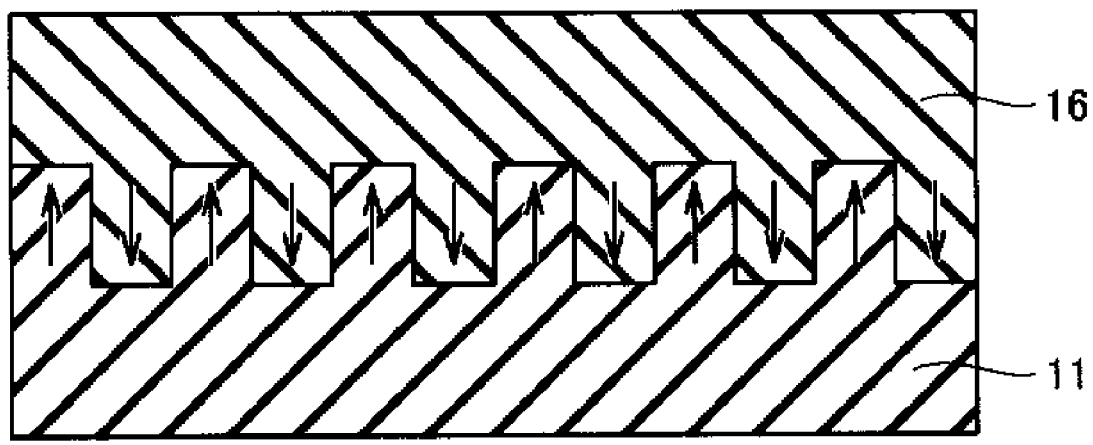
FIG. 9 is a simplified sectional diagram representing a situation in which amorphous crystal has been grown, in Embodying Mode 4 of the present invention.

Reference is made to FIG. 9, a simplified sectional diagram representing a situation in which amorphous crystal 16 has been grown in the present embodying mode. Next, as indicated in FIG. 9 second crystal, being amorphous crystal 16 whose difference in refractive index from that of the first crystal 11 is essentially nil, is grown onto a surface of the first crystal 11. In this step, a domain inversion structure in which the polar directions of the first and second crystals 11 and 12 periodically reverse along the optical waveguide 13 is formed, and the first and second crystals 11 and 12 are formed in such a way that the domain inversion structure satisfies quasi-phase-matching conditions for an incoming beam 101.

In the present embodying mode, a second crystal that is amorphous crystal 16 of the same chemical composition as the first crystal 11 is grown. Amorphous crystal 16 of refractive index that is essentially not different from that of the first crystal 11 can thereby be grown. In particular, the amorphous crystal 16 is preferably grown so that its difference in refractive index at 400 to 800 nm wavelength from that the first crystal is from 0.001 to 0.1. Here, the method whereby the amorphous crystal 16 is grown is not particularly limited.

When the amorphous crystal 16 is grown, the polarities of the first crystal 11 and the amorphous crystal 16 turn out oppositely oriented. The domain inversion structure can therefore be created with ease. This procedure makes it possible to manufacture the wavelength converter 10d depicted in FIG. 8.

In accordance with a method, as described above, in the present embodying mode of manufacturing a wavelength converter 10d, amorphous crystal 16 having essentially no difference in refractive index from that of the first crystal 11 is grown onto a surface of the first crystal 11 as the second crystal. Accordingly, there is essentially no difference in refractive index between the first crystal 11 and the amorphous crystal 16 as the second crystal. What is more, utilizing the first crystal 11 and amorphous crystal 16 enables facilitated formation of a poled structure. Therefore, when an incoming beam 101 is transmitted through the optical waveguide 13, reflection in the optical waveguide 13 at the boundary between the first crystal 11 and amorphous crystal 16 can be minimized. Consequently, transmissivity losses at the boundary between the first crystal 11 and amorphous crystal 16 can be reduced, thus making it possible to manufacture a wavelength converter 10d in which the transmissivity is improved.

EMBODIMENTS

In the present embodiment, the effect of providing a step of forming a first crystal 11 and a second crystal 12 by sectioning a crystal 22 into two or more in such a way that the domains are the reverse of each other was investigated.

Present Invention Examples 1 and 2

Wavelength converters in Examples 1 and 2 of the present invention were manufactured basically following Embodying Mode 1. Specifically, to begin with, AlN single-crystal substrates and Al$_{0.5}$Ga$_{0.5}$N single-crystal substrates, with the major surface 22a being the (001) face, were respectively prepared as starting substrates 21 for present invention Examples 1 and 2.

Next, crystal 22 of the same chemical composition as the starting substrates 21 was grown by sublimation deposition onto the starting substrates 21. CMP polishing was thereafter carried out on the front side of the crystals 22.

Next, the crystals 22 were sectioned into at least two, as indicated in FIG. 7, in such a way that the domains would be the reverse of each other, to form comb-like first crystals 11 and second crystals 12. Thirty-eight each of the first and second crystals 11 and 12 were formed. Here, in the projections on the first and second crystals 11 and 12, the width of the sections constituting the wall faces in the optical waveguide 13 (in the case of the first crystals 11, the width $W_{11}$ as indicated in FIG. 8) was rendered 26.6 µm.

Further, the dislocation densities in the obtained first and second crystals 11 and 12 were respectively characterized by means of molten alkali etching employing KOH—NaOH (sodium hydroxide). The result was a dislocation density of $1\times10^3$ cm$^{-2}$ for the first and second crystals 11 and 12 of present invention Examples 1 and 2.

Next, the first and second crystals 11 and 12 were alternately 38-cycle interlocked. This formed domain inversion structures in which the polar directions of the first and second crystals 11 and 12 periodically reverse along an optical waveguide 13 as indicated in FIG. 1, with the domain inversion structure satisfying quasi-phase-matching conditions for an incoming beam 101. Wavelength converters 10a of present invention Examples 1 and 2 were thereby manufactured.

Evaluation Results

With regard to the wavelength converters of present invention Examples 1 and 2, a beam from an Nd—YAG laser (neodymium:YAG laser) of 1064 nm wavelength was input as an incoming beam into the optical waveguide 13 in such a way as to be perpendicular to the poling interfaces 14 of the first and second crystals 11 and 12. An outgoing beam 102 of 532 nm wavelength was output as a result.

In accordance with the foregoing, the first and second crystals 11 and 12 were formed from the same crystal 22, and thus the refractive index of the first and second crystals 11 and 12 was the same. It was therefore confirmed that with wavelength converters of present invention Examples 1 and 2, an input incoming beam 101 could be transmitted through the optical waveguide 13, and extracted as a wavelength-converted outgoing beam 102.

While a description of embodying modes and embodiment examples of the present invention has been undertaken in the foregoing manner, combining the features of each of the embodying modes and embodiment examples to suit is contemplated from the outset. Furthermore, the presently disclosed embodying modes and embodiment examples should in all respects be considered to be illustrative and not limiting. The scope of the present invention is set forth not by the foregoing embodying modes but by the scope of the patent claims, and is intended to include meanings equivalent to the scope of the patent claims and all modifications within the scope.

What is claimed is:

1. A method of manufacturing a wavelength converter that has an optical waveguide and that converts the wavelength of an incoming beam input into the optical waveguide through one end thereof, and outputs an outgoing beam from the optical waveguide through the other end thereof, the wavelength converter manufacturing method comprising:
    a step of growing a crystal composed of $Al_xGa_{(1-x)}N$ ($0.5 \leq x \leq 1$) and having a dislocation density of from $1\times10^3$ cm$^{-2}$ to less than $1\times10^7$ cm$^{-2}$;
    a step of forming a first crystal and a second crystal by sectioning said crystal into two or more in such a way that the domains are the reverse of each other; and
    a step of interlocking the first and second crystals in such a way that a domain inversion structure in which the polar directions of the first and second crystals periodically reverse along the optical waveguide is formed, and the domain inversion structure satisfies quasi-phase-matching conditions for the incoming beam.

2. A wavelength converter manufacturing method as set forth in claim 1, further comprising, following said step of forming the first and second crystals, a step of etching the surface on at least one side of the first and second crystals.

3. A wavelength converter manufacturing method as set forth in claim 1, further comprising, following said step of forming the first and second crystal, a step of polishing the surface on at least one side of the first and second crystals.

4. A wavelength converter manufacturing method as set forth in claim 2, further comprising, following said step of forming the first and second crystal, a step of polishing the surface on at least one side of the first and second crystals.

5. A method of manufacturing a wavelength converter that has an optical waveguide and that converts the wavelength of an incoming beam input into the optical waveguide through one end thereof, and outputs an outgoing beam from the optical waveguide through the other end thereof, the wavelength converter manufacturing method comprising:
    a step of preparing a first crystal composed of $Al_xGa_{(1-x)}N$ ($0.5 \leq x \leq 1$);
    a step of preparing a second crystal composed of $Al_xGa_{(1-x)}N$ ($0.5 \leq x \leq 1$) and in which there is essentially no difference in refractive index from that of the first crystal; wherein
    in said first and second crystal preparation steps at least one or the other of the first and second crystals is prepared to have a dislocation density of from $1\times10^3$ cm$^{-2}$ to less than $1\times10^7$ cm$^{-2}$; and
    a step of interlocking the first and second crystals in such a way that a domain inversion structure in which the polar directions of the first and second crystals periodically reverse along the optical waveguide is formed, and the domain inversion structure satisfies quasi-phase-matching conditions for the incoming beam.

6. A wavelength converter, being a wavelength converter having an optical waveguide and converting the wavelength of an incoming beam input into the optical waveguide through one end thereof, and outputting an outgoing beam from the optical waveguide through the other end thereof, comprising:
    a first crystal composed of $Al_xGa_{(1-x)}N$ ($0.5 \leq x \leq 1$); and
    a second crystal composed of $Al_xGa_{(1-x)}N$ $0.5 \leq x \leq 1$), and in which there is essentially no difference in refractive index from that of the first crystal; wherein
    at least one or the other of said first and second crystals has a dislocation density of from $1\times10^3$ cm$^{-2}$ to less than $1\times10^7$ cm$^{-2}$; and
    said first and second crystals are interlocked in an interdigitated configuration, forming a domain inversion structure in which the polar directions along the optical waveguide periodically reverse, with the domain inversion structure satisfying quasi-phase-matching conditions for the incoming beam.

7. A wavelength converter as set forth in claim 6, wherein:
    said first and second crystals have regularly arrayed projections and recesses; and
    the projections on said first crystal and the recesses in said second crystal are coupled together.

* * * * *